United States Patent [19]

Hageman

[11] Patent Number: 4,922,568
[45] Date of Patent: May 8, 1990

[54] HOLDDOWN MECHANISM FOR A DOCKBOARD

[75] Inventor: Martin P. Hageman, Mequon, Wis.

[73] Assignee: Kelley Company Inc., Milwaukee, Wis.

[21] Appl. No.: 257,874

[22] Filed: Oct. 14, 1988

[51] Int. Cl.⁵ .............................................. E01D 1/00
[52] U.S. Cl. ...................................... 14/71.3; 14/71.1
[58] Field of Search ..................... 14/71.1, 71.3, 71.7; 104/31; 105/436, 458; 119/82

[56] References Cited

U.S. PATENT DOCUMENTS

| | | | |
|---|---|---|---|
| 3,117,332 | 1/1964 | Kelley et al. | 14/71.3 |
| 3,170,179 | 2/1965 | Layne | 14/71.3 |
| 3,201,814 | 8/1965 | Le Clear | 14/71.7 |
| 3,203,002 | 8/1965 | McGuire | 14/71.3 |
| 3,271,801 | 9/1966 | Dieter et al. | 14/71.3 |
| 3,316,575 | 5/1967 | Larsen et al. | 14/71.3 |
| 3,368,229 | 2/1968 | Pfleger | 14/71.3 |
| 3,646,627 | 3/1972 | Potter | 14/71.3 |
| 4,257,136 | 3/1981 | Loblock | 14/71.3 |

FOREIGN PATENT DOCUMENTS 513091 5/1955 Canada ................................ 14/71.3

Primary Examiner—Bruce M. Kisliuk
Attorney, Agent, or Firm—Andrus, Sceales, Starke & Sawall

[57] ABSTRACT

An improved dockboard mechanism for a mechanical dockboard. The dockboard includes a frame that is mounted on a loading dock and a ramp is hinged at its rear end to the frame and is movable between a generally horizontal cross traffic position and an upwardly inclined position. The ramp is biased to the upwardly inclined position by a counterbalancing spring. The holddown mechanism includes a cylinder connected to the ramp and a piston is slidable within the cylinder and carries a piston rod which is connected to the frame. The piston is provided with a longitudinal passage which is closed off by a valve member, and an actuating rod is connected to the valve member and extends outwardly of the cylinder. Movement of the rod will open the valve member to permit extension of the piston rod with respect to the cylinder to enable the ramp to pivot upwardly by the counterbalancing spring.

20 Claims, 2 Drawing Sheets

U.S. Patent  May 8, 1990  Sheet 1 of 2  4,922,568
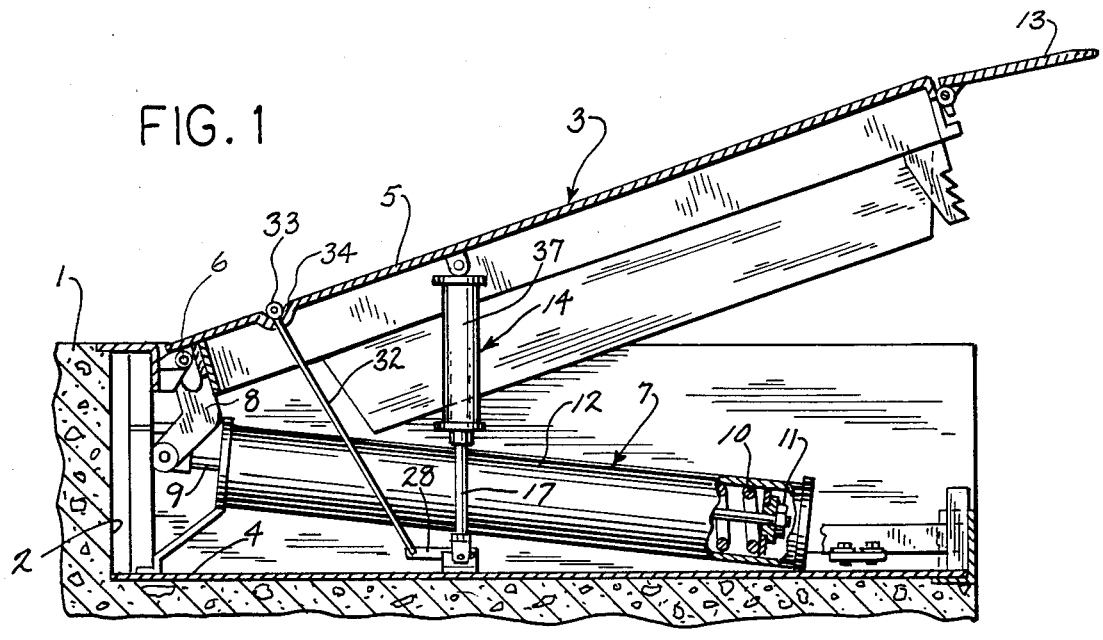
FIG. 1
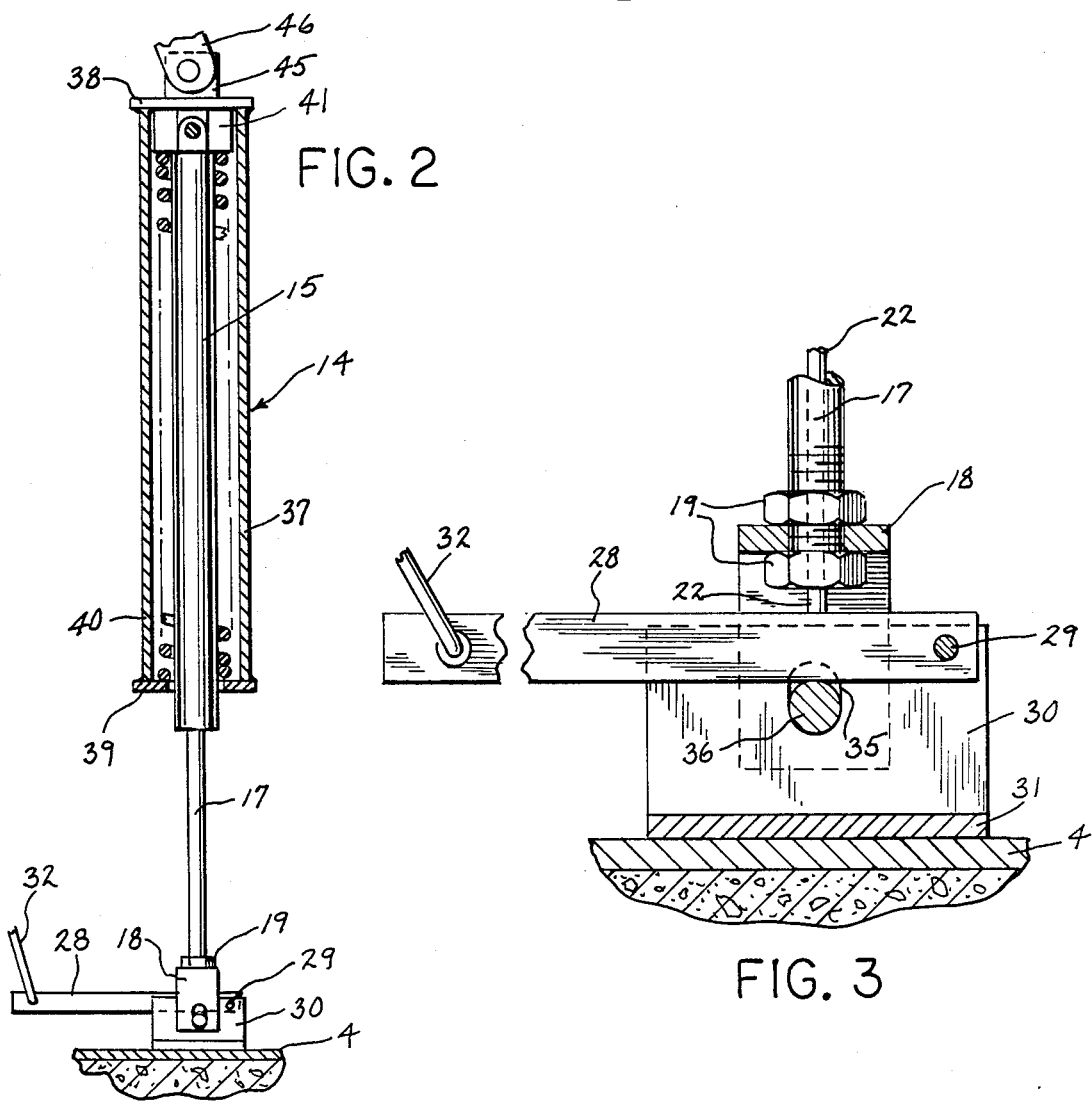
FIG. 2
FIG. 3

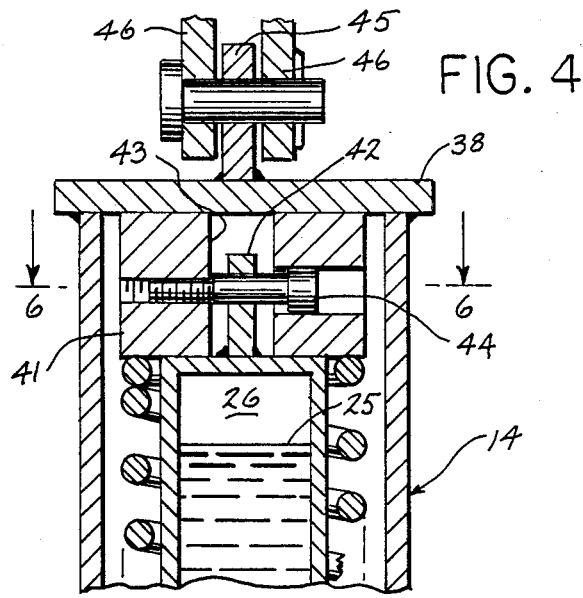
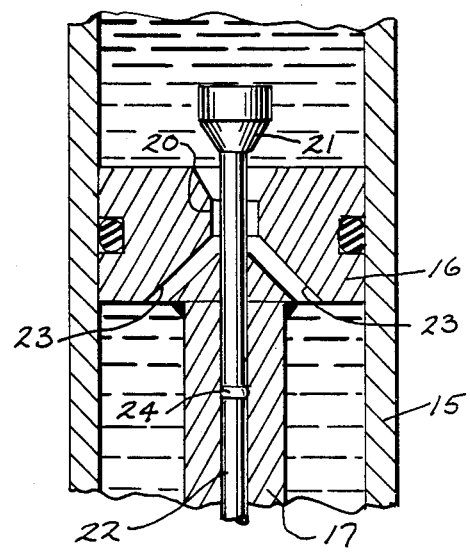
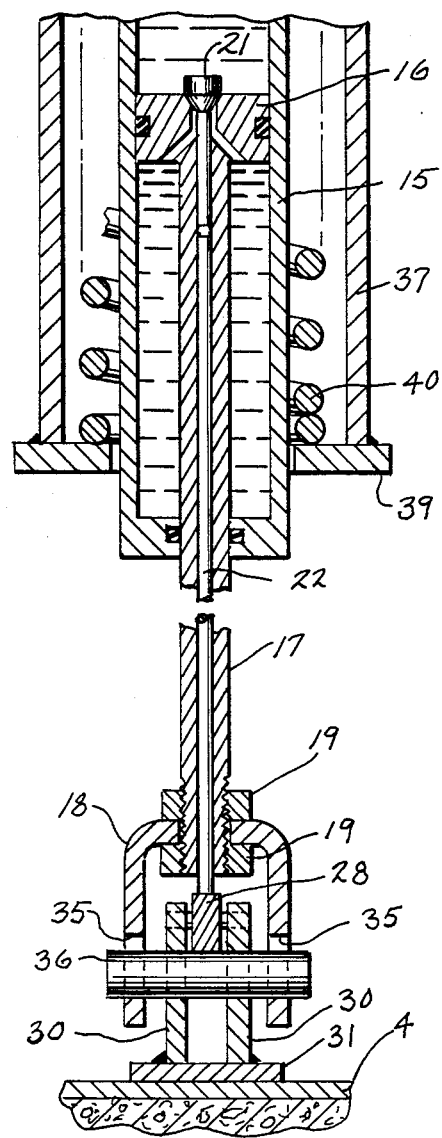
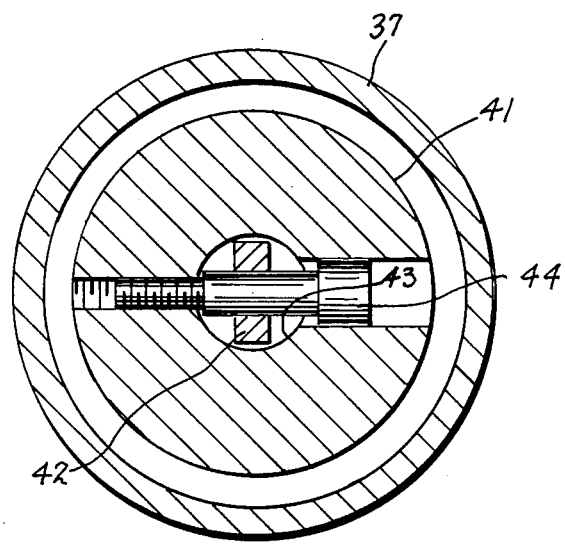
FIG. 4
FIG. 5
FIG. 6

HOLDDOWN MECHANISM FOR A DOCKBOARD

BACKGROUND OF THE INVENTION

A common form of dockboard is installed in a shallow depression or pit in a loading dock and includes a ramp that is hinged at its rear edge to the dock and an extension lip is hinged to the front edge of the ramp. The ramp is adapted to be moved from a generally horizontal cross traffic position, where it is flush with the upper surface of the dock, to an upper inclined position. Due to the substantial weight of the ramp and lip, a counterbalancing mechanism, such as a spring, is employed to bias the ramp upwardly to the inclined position. In addition, a releasable holddown mechanism interconnects the dock and the ramp and locks the ramp against upward movement unless manually released.

When not in use, the ramp is locked or held down by the holddown mechanism in the cross traffic position. When a truck or other carrier backs into position in front of the dock, an operator manually releases the holddown mechanism so that the counterbalancing spring will then pivot the ramp upwardly to the inclined position. As a consequence of the upward pivotal movement of the ramp, a lip lifting and latching mechanism is actuated to pivot the lip outwardly to an extended position. The operator then walks outwardly on the inclined ramp and his weight will overbalance the force of the counterbalancing spring to lower the ramp and move the extended lip into engagement with the bed of the truck.

The conventional holddown mechanism is a one-way locking device which is arranged so that the ramp can be moved downwardly without restraint yet the holddown mechanism, unless manually released, will prevent upward movement of the ramp.

U.S. Pat. No. 3,646,627 describes a holddown mechanism for a dockboard which incorporates a pawl and ratchet mechanism. The holddown mechanism of the aforementioned patent includes a tubular housing having one end pivotally connected to the frame and a compression spring is mounted with the housing. A tube is positioned concentrically within the spring and the force of the spring acts against the cap on the end of the tube to urge the tube into a telescoped position with respect to the housing.

Mounted for sliding movement within the tube is a ratchet bar and the outer end of the ratchet bar is pivotally connected to the ramp. The ratchet bar is locked with respect to the tube by a double pawl mechanism which engages the teeth of the ratchet. To release the pawls from the ratchet bar, an operator pivots a handle through an operating cable which acts to pivot the pawls out of engagement with the ratchet bar teeth and thereby enables the counterbalancing mechanism to elevate the ramp to the inclined position.

When the ramp is walked downwardly by the operator, the ratchet bar will move inwardly with respect to the tube and the pawls and ratchet bar are arranged so that the ratchet bar can move to the retracted position without locking interference from the pawls.

SUMMARY OF THE INVENTION

The invention is directed to an improved holddown mechanism for a dockboard. In accordance with the invention, the holddown mechanism includes a hydraulic cylinder having one end connected to the under surface of the ramp. A piston is slidable within the cylinder and carries a tubular piston rod which projects through the lower end of the cylinder and is pivotally connected to the frame of the dockboard.

The piston is formed with a longitudinal passage which can be closed by a valve, and the valve is connected to the upper end of an actuating rod that extends through the tubular piston rod, with the lower end of the actuating rod being connected to a manually operable lever.

Under normal conditions, the valve will be closed so that the piston is locked in position relative to the cylinder, thereby preventing the ramp from moving upwardly to the inclined position.

To enable the ramp to pivot upwardly under the influence of the counterbalancing mechanism, the operator actuates the operating lever causing the actuating rod to move upwardly to open the valve. With the valve open, the ramp can move upwardly through the influence of the counterbalancing mechanism and the hydraulic fluid will be displaced from the upper end of the cylinder through the passage in the piston to the lower end. By releasing the operating lever, the valve will be closed thereby locking the piston relative to the cylinder and preventing movement of the ramp relative to the dock.

When the operator walks outwardly on the inclined ramp, the added weight of the operator overbalances the force of the counterbalancing mechanism causing the ramp to descend. Descent of the ramp moves the cylinder downwardly relative to the actuating rod and valve, thereby opening the valve and permitting hydraulic fluid from the lower end of the cylinder to move upwardly through the passage to the upper end as the ramp descends.

With the construction of the invention, the holddown permits free down movement of the ramp but will prevent upward movement of the ramp under the influence of the counterbalancing spring unless the holddown is manually released.

The holddown mechanism also incorporates a spring that interconnects the ramp and the cylinder. The spring permits the cylinder to follow upward float or movement of the ramp when the valve is in the closed position. During a loading operation as cargo is removed from the truck bed, the truck bed may rise slightly and the float spring will enable the holddown to follow this upward float of the ramp when the valve is in a locked condition.

The holddown mechanism of the invention has a smoother operation than conventional holddowns and provides an infinite adjustment as opposed to prior devices using a ratchet and pawl arrangement. This is a particular advantage in accommodating float of the ramp during a loading operation.

As a further advantage, the holddown mechanism of the invention requires a lesser force to release the locking lever and provides a quieter operation in that there is no metal-to-metal contact as in prior devices.

As previously noted, the float spring enables the holddown to accommodate upward float of the ramp, while downward movement of the ramp will cause the valve to open so that the ramp can move downwardly without restraint.

As the major operating components of the holddown mechanism of the invention are confined and not exposed to the environment, the mechanism is less susceptible to contamination and requires less maintenance and does not require lubrication.

Other objects and advantages will appear in the course of the following description.

DESCRIPTION OF THE DRAWINGS

The drawings illustrate the best mode presently contemplated of carrying out the invention.

In the Drawings:

FIG. 1 is a vertical section of a dockboard incorporating the holddown mechanism of the invention with the ramp being shown in the upwardly inclined position;

FIG. 2 is an enlarged side elevation of the holddown mechanism with parts broken way in section;

FIG. 3 is an enlarged fragmentary vertical section showing the attachment of the piston rod of the cylinder unit to the frame;

FIG. 4 is an enlarged longitudinal section of the holddown mechanism;

FIG. 5 is an enlarged fragmentary longitudinal section of the cylinder unit with the valve in the open position; and FIG. 6 is a transverse section taken along line 6—6 of FIG. 4.

DESCRIPTION OF THE ILLUSTRATED EMBODIMENT

FIG. 1 illustrates a loading dock 1 formed with a shallow pit or depression 2 and a dockboard 3 is installed in the pit. Dock board 3 includes a structural mounting frame 4 and the rear end of a ramp 5 is hinged to the frame 4 about a horizontal pivot axis 6. Ramp 5 is biased to an upwardly inclined position by a counterbalancing mechanism 7 which can be similar to that described in U.S. Pat. No. 3,528,118.

The counterbalancing mechanism 7 includes a lever arm 8 which is secured to the rear end of ramp 5. One end of a rod 9 is connected to the lower end of the lever arm and a coil spring 10 is disposed around the forward end of rod 9 and bears against a retainer 11 which is threaded on the forward end of the rod. A tube 12 surrounds the coil spring and is fixed to the frame of the ramp. With this construction, as described in U.S. Pat. No. 3,528,118, the force of the coil spring will act to pivot the lever arm 8 rearwardly to thereby pivot the ramp from the horizontal cross traffic position to the upwardly inclined position as shown in FIG. 1.

An extension lip 13 is hinged to the forward end of ramp 5 and is movable between a downwardly hanging pendant position and an outwardly extended position. Lip 13 can be moved between the pendant and extended position by a lip lifting and latching mechanism as described in U.S. Pat. No. 3,203,002.

In accordance with the invention, a holddown mechanism 14 interconnects the frame and the ramp and serves as a one way locking device, permitting free downward movement of the ramp but restraining upward movement of the ramp unless manually released. Holddown mechanism 14 includes a cylinder 15 and a piston 16 is slidable within cylinder 15 and carries a hollow piston rod 17. The lower end of piston rod 17 extends through the lower end of cylinder 15 and is attached to a yolk 18. As best shown in FIG. 3, nuts 19 are threaded on the lower end of piston rod 17 and straddle yolk 18 to provide a connection between the piston rod and the yolk.

Piston 16 is formed with an axial passage 20 and the upper end of the passage 20 defines a valve seat which is adapted to be closed by a valve 21. Valve 21 is carried by an actuating rod 22 which extends through passage 20 and downwardly through the hollow piston rod 17. As shown in FIGS. 3 and 4, the lower end of actuating rod 22 projects outwardly beyond the lower end of piston rod 17. Axial passage 20 is connected via diagonal ports 23 with the lower surface of piston 16, as illustrated in FIG. 5.

Actuating rod 22 is adapted to slide relative to piston rod 17 and an O-ring seal 24 is mounted within in a groove in rod 22 and serves to seal the interface between piston rod 17 and actuating rod 22.

Cylinder 15 is adapted to contain a relatively incompressible hydraulic fluid, such as oil, and the upper level of the oil, indicated by 25, is spaced from the upper end of cylinder to provide a head space 26 which contains a compressible gas, such as air or nitrogen. During operation of the holddown mechanism, oil is adapted to move from one end of the cylinder to the other through the open passage 20 and as the piston rod enters the lower portion of the cylinder, increased rod volume is obtained so that the oil formerly occupying the volume of the rod acts to compress the gas in head space 26.

An actuating lever 28 is mounted through pivot pin 29 to a pair of spaced vertical plates 30 which extend upwardly from base plate 31 that is attached to frame 4. The central portion of lever 28 bears against the lower end of actuating rod 22 while a cable 32 is connected to the outer end of lever 28. Cable 32 extends upwardly and is attached to a ring 33 which is mounted within a well 34 in the ramp. Ring 34 is adapted to be manually actuated by an operator standing on the ramp as will be hereinafter described.

The arms of yolk 18 are provided with vertically elongated slots 35 and a pin 36 extends through slots 35 and through aligned holes in plates 30, as best shown in FIG. 4.

To accommodate upward float of the truck bed and ramp during a loading operation, a tube 37 is disposed around cylinder 15 and the ends of the tube are enclosed by a top plate 38 and bottom plate 39 respectively. Piston rod 17 extends through a suitable hole in bottom plate 39.

A coil spring 40 is disposed in the annular space between tube 37 and cylinder 15. The lower end of spring 40 bears against bottom plate 39, while the upper end of the spring bears against a cap 41 which is secured to the upper end of the cylinder 15. A lug 42 extends upwardly from the upper end of cylinder 15 and is received within a central opening 43 in cap 41. Bolt 44 extends through aligned openings in the cap 41 and the lug 42 to connect the cylinder 15 to cap 41.

The outer tube 37 is connected to the under surface of ramp 5. In this regard, a lug 45 extends upwardly from top plate 38 and is pivotally connected to brackets 46 on the underside of the ramp.

The ramp 5 is normally stored in a horizontal cross traffic position. In this position, valve 21 will be closed, thereby locking piston 16 relative to cylinder 15 and preventing the ramp from being elevated under the influence of the counterbalancing mechanism 7.

After a truck backs to a loading position in front of the dock, the operator pulls upwardly on ring 33, thereby pivoting lever 28 upwardly to move actuating rod 22 upwardly relative to piston rod 17. Upward movement of rod 22 will open the valve 21 so that the ramp can then pivot upwardly through action of the counterbalancing mechanism 7. As the ramp moves upwardly, cylinder 15 will correspondingly move upwardly relative to piston 16 causing fluid in the lower end of the cylinder 15 to flow upwardly through passage 20 into the upper end of the cylinder. After the ramp has been elevated to the upwardly inclined position as shown in FIG. 1, the operator releases the ring 33 which will cause valve 21 to move to the closed position, thereby locking piston 16 relative to cylinder 15. With the piston locked in position relative to cylinder 15, the ramp will be held in the upwardly inclined position.

The operator will then walk outwardly on the ramp and the combined weight of the operator and the ramp will overcome the force of the counterbalancing mechanism 7. As cylinder 15 is locked to piston 16, initial downward movement of the ramp will move cylinder 15 and piston 16 downwardly relative to actuating rod 22, thereby opening valve 21 and permitting oil from the upper end of the cylinder to flow freely through passage 20 to the lower end of the cylinder. The slotted connection of yoke 18 to pin 36 permits the cylinder and locked piston to move downwardly relative to actuating rod 22.

When the extended lip of the dockboard engages the bed of the truck, downward movement of the ramp 5 will be terminated, thus closing valve 21 and locking the piston 16 relative to the cylinder 15.

If during a loading operation cargo or material handling equipment is added to the truck bed, the truck bed and ramp 5 will move downwardly a slight distance, causing cylinder 15 and piston 16 to move downwardly relative to actuating rod 22 to open the valve 21 and permit downward movement of the ramp. Thus the holddown mechanism will automatically follow downward float of the truck bed.

On the other hand, if cargo or weight is removed from the truck bed, the truck bed and ramp will tend to rise. As the piston 16 is locked relative to cylinder 15, upward movement of the ramp will compress spring 40 to enable the ramp to move upwardly relative to the cylinder 15 to thereby accommodate the upward float of the truck bed. Thus the holddown is capable of accommodating both upward and downward float during a loading operation.

The holddown mechanism of the invention provides an infinite adjustment of position as opposed to prior art devices that used a ratchet and pawl arrangement. With a ratchet and pawl, the holddown only extends and retracts in increments, and the infinite adjustment of the holddown of the invention has particular advantage in accommodating downward float of the ramp during the loading operation.

As a further advantage, the holddown has a smoother and quieter operation than holddown mechanisms as used in the past, and as the operating components are confined and not directly exposed to the environment, the mechanism is less susceptible to contamination.

As an added advantage, lesser manual force is required to release the holddown mechanism as compared to prior holddowns using a ratchet and pawl system.

Various modes of carrying out the invention are contemplated as being within the scope of the following claims particularly pointing out and distinctly claiming the subject matter which is regarded as the invention.

I claim:

1. In a dockboard, a frame to be mounted on a loading dock, a ramp having a rear end pivotally connected to the frame and movable from a generally horizontal position to an upwardly inclined position, biasing means interconnecting the frame and the ramp to bias the ramp to said upwardly inclined position, and a holddown mechanism interconnecting the frame and the ramp, said holddown mechanism including a cylinder member to contain a substantially incompressible fluid, a piston mounted for sliding movement in the cylinder member, passage means connecting opposite ends of said cylinder member, a piston rod member connected to said piston, one of said members being connected to said ramp and the other of said members being connected to said frame, valve means for opening and closing said passage means, and operating means operably connected to said valve means and extending to the exterior of said cylinder member for opening said valve means, said piston rod member comprising a hollow tube and said operating means comprises an elongated element slidably disposed within said piston rod member, one end of said elongated element engaged with said valve means and the opposite end extending outwardly of said piston rod member, opening of said valve means permitting said piston to move relative to said cylinder member and enabling said ramp to be pivoted upwardly relative to said frame by said biasing means, and closing of said valve means acting to lock the ramp against downward movement.

2. The dockboard of claim 1, wherein said passage means is disposed axially of said piston and said elongated element is a rod extending through said passage means and connected to said valve means.

3. The dockboard of claim 1, wherein said operating means also includes manual actuating means operably connected to said opposite end of said elongated element.

4. The dockboard of claim 3, wherein said actuating means comprises a lever pivotally connected to the frame and engaged with said opposite end of said elongated element.

5. The dockboard of claim 1, and including means responsive to an external downward force applied to the ramp when said piston is locked relative to said cylinder member to open said valve means and permit downward movement of said ramp.

6. The dockboard of claim 5, wherein said means responsive to an external downward force comprises means for moving said cylinder member and said piston downwardly relative to said valve means to open said valve means.

7. In a dockboard, a frame mounted on a loading dock, a ramp having a rear end hinged to said frame and movable between a generally horizontal position and an upwardly inclined position, counterbalancing means interconnecting the frame and the ramp for urging said ramp to said upwardly inclined position, and a holddown mechanism interconnecting said frame and said ramp, said holddown mechanism comprising a cylinder connected to said ramp, a piston slidable in said cylinder, a piston rod connected to said piston and pivotally connected to said frame, said piston having a longitudinal passage therethrough with the upper end of said passage defining a valve seat, valve means to engage said seat and open and close said passage, operating means operably connected to said valve means and extending to the exterior of said cylinder for moving said valve means from the closed to the open position to permit the ramp to move to the inclined position under the influence of said counterbalancing means, means responsive to an external downward force applied to the ramp when said valve means is closed to open said valve means and permit downward movement of said ramp relative to said frame, and resilient means interconnecting said ramp and said cylinder and constructed and arranged to permit limited upward movement of said ramp relative to said cylinder when said valve means is closed to accommodate upward float of said ramp.

8. The dockboard of claim 7 wherein said resilient means comprises a spring interconnecting said cylinder and said ramp.

9. The dockboard of claim 8, wherein said spring is disposed concentrically around said cylinder, one end of said spring being engaged with the cylinder and the opposite end of said spring being operably connected to said ramp, said spring being constructed and arranged so that upward movement of said ramp will compress said spring.

10. The dockboard of claim 7, wherein the upper end of said cylinder defines a headspace containing a compressible gas.

11. In a dockboard, a frame mounted on a loading dock, a ramp having a rear end hinged to said frame and movable between a generally horizontal position and an upwardly inclined position, counterbalancing means for urging said ramp to said upwardly inclined position, and a holddown mechanism interconnecting said frame and said ramp, said holddown mechanism comprising a cylinder connected to said ramp, a piston slidable in said cylinder, a piston rod connected to said piston and pivotally connected to said frame, said piston having a longitudinal passage therethrough with the upper end of said passage defining a valve seat, valve means to engage said seat and open and close said passage, said piston rod being a tubular member, an elongated element slidably disposed within said piston rod and having one end operably connected to said valve means, the opposite end of said elongated element projecting outwardly of the piston rod, and manual actuating means operably connected to said opposite end of said elongated element for moving said element relative to said piston rod to thereby move said valve means to the open position and permit said ramp to move from the horizontal position to the inclined position under the influence of said counterbalancing means.

12. The dockboard of claim 11, wherein said actuating means comprises a lever pivotally connected to the frame and operably connected to the opposite end of said elongated element.

13. The dockboard of claim 12, wherein said actuating means also includes a flexible member having one end connected to said lever and the opposite end disposed on the upper surface of the ramp in position to be manually engaged.

14. The dockboard of claim 11, and means operable as a consequence of an external downward force being applied to said ramp when said valve means is closed of sufficient magnitude to overcome the force of said counterbalancing means for opening said valve means and permitting downward movement of said ramp.

15. In a dockboard, a frame to be mounted on a loading dock, a ramp having a rear end pivotally connected to the frame and movable from a generally horizontal position to an upwardly inclined position, biasing means interconnecting the frame and the ramp to bias the ramp to said upwardly inclined position, and a holddown mechanism interconnecting the frame and the ramp, said holddown mechanism including a cylinder member to contain a substantially incompressible fluid, a piston mounted for sliding movement in the cylinder member, said cylinder member including a headspace disposed above the level of said fluid and containing a compressible gas, passage means connecting opposite ends of said cylinder member, a piston rod member connected to said piston, one of said members being connected to said ramp and the other of said members being connected to said frame, valve means for opening and closing said passage means, and operating means operably connected to said valve means and extending to the exterior of said cylinder member for opening said valve means, opening of said valve means permitting said piston to move relative to said cylinder member and enabling said ramp to be pivoted upwardly relative to said frame by said biasing means, and closing of said valve means acting to lock the ramp against downward movement.

16. In a dockboard, a frame to be mounted on a loading dock, a ramp having a rear end pivotally connected to the frame and movable from a generally horizontal position to an upwardly inclined position, biasing means interconnecting the frame and the ramp to bias the ramp to said upwardly inclined position, and a holddown mechanism interconnecting the frame and the ramp, said holddown mechanism including a cylinder member to contain a substantially incompressible fluid, a piston mounted for sliding movement in the cylinder member, passage means connecting opposite ends of said cylinder member, a piston rod member connected to said piston, one of said members being connected to said ramp and the other of said members being connected to said frame, valve means for opening and closing said passage means, and operating means operably connected to said valve means and extending to the exterior of said cylinder member for opening said valve means, said passage means being disposed axially of said piston, said piston rod member comprising a tube, said operating means comprising a rod disposed within said tube with one end of said rod connected to said valve means, opening of said valve means permitting said piston to move relative to said cylinder member and enabling said ramp to be pivoted upwardly relative to said frame by said biasing means, and closing of said valve means acting to lock the ramp against downward movement.

17. In a dockboard, a frame to be mounted on a loading dock, a ramp having a rear end pivotally connected to the frame and movable from a generally horizontal position to an upwardly inclined position, biasing means interconnecting the frame and the ramp to bias the ramp to said upwardly inclined position, and a holddown mechanism interconnecting the frame and the ramp, said holddown mechanism including a cylinder member to contain a substantially incompressible fluid, a piston mounted for sliding movement in the cylinder member, passage means connecting opposite ends of said cylinder member, a piston rod member connected to said piston, one of said members being connected to said ramp and the other of said members being connected to said frame, valve means for opening and closing said passage means, operating means operably connected to said valve means and extending to the exterior of said cylinder member for opening said valve means and, resilient means for permitting limited upward movement of said ramp relative to said cylinder member when an external upward force is applied to the ramp and the piston is locked to the cylinder member, opening of said valve means permitting said piston to move relative to said cylinder member and enabling said ramp to be pivoted upwardly relative to said frame by said biasing means, and closing of said valve means acting to lock the ramp against downward movement.

18. In a dockboard, a frame mounted on a loading dock, a ramp having a rear end hinged to said frame and movable between a generally horizontal position and an upwardly inclined position, counterbalancing means interconnecting the frame and the ramp for urging said ramp to said upwardly inclined position, and a holddown mechanism interconnecting said frame and said ramp, said holddown mechanism comprising a cylinder connected to said ramp, a piston slidable in said cylinder, a piston rod connected to said piston and pivotally connected to said frame, said piston having a longitudinal passage therethrough with the upper end of said passage defining a valve seat, valve means to engage said seat and open and close said passage, operating means operably connected to said valve means and extending to the exterior of said cylinder for moving said valve means from the closed to the open position to permit the ramp to move to the inclined position under the influence of said counterbalancing means, means responsive to an external downward force applied to the ramp when said valve means is closed to open said valve means and permit downward movement of said ramp relative to said frame, said piston rod comprising a tubular member and said operating means including an operating rod disposed within said tubular member, said operating means also including manually operable control means operably connected to said operating rod to move said rod relative to said piston rod to open and close said valve means.

19. In a dockboard, a frame mounted on a loading dock, a ramp having a rear end hinged to said frame and movable between a generally horizontal position and an upwardly inclined position, counterbalancing means interconnecting the frame and the ramp for urging said ramp to said upwardly inclined position, and a holddown mechanism interconnecting said frame and said ramp, said holddown mechanism comprising a cylinder member, a piston slidable in said cylinder member, a piston rod member connected to said piston, a first of said members being connected to said frame and a second of said members being connected to said ramp, said piston having a longitudinal passage therethrough with the upper end of said passage defining a valve seat, valve means to engage said seat and open and close said passage, operating means operably connected to said valve means and extending to the exterior of said cylinder member for moving said valve means from the closed to the open position to permit the ramp to move to the inclined position under the influence of said counterbalancing means, and means responsive to an external downward force applied to the ramp when said valve means is closed to open said valve means and permit downward movement of said ramp relative to said frame, said means responsive to an external force comprising a lost motion connection between said first member and said frame.

20. In a dockboard, a frame mounted on a loading dock, a ramp having a rear end hinged to said frame and movable between a generally horizontal position and an upwardly inclined position, counterbalancing means interconnecting the frame and the ramp for urging said ramp to said upwardly inclined position, and a holddown mechanism interconnecting said frame and said ramp, said holddown mechanism comprising a cylinder connected to said ramp, the upper end of said cylinder defining a headspace containing a compressible gas, a piston slidable in said cylinder, a piston rod connected to said piston and pivotally connected to said frame, said piston having a longitudinal passage therethrough with the upper end of said passage defining a valve seat, valve means to engage said seat and open and close said passage, operating means operably connected to said valve means and extending to the exterior of said cylinder for moving said valve means from the closed to the open-position to permit the ramp to move to the inclined position under the influence of said counterbalancing means, and means responsive to an external downward force applied to the ramp when said valve means is closed to open said valve means and permit downward movement of said ramp relative to said frame.

* * * * *